Feb. 13, 1923.
H. G. WESTGATE ET AL
1,444,892
TIRE FILLER
Filed Jan. 26, 1921
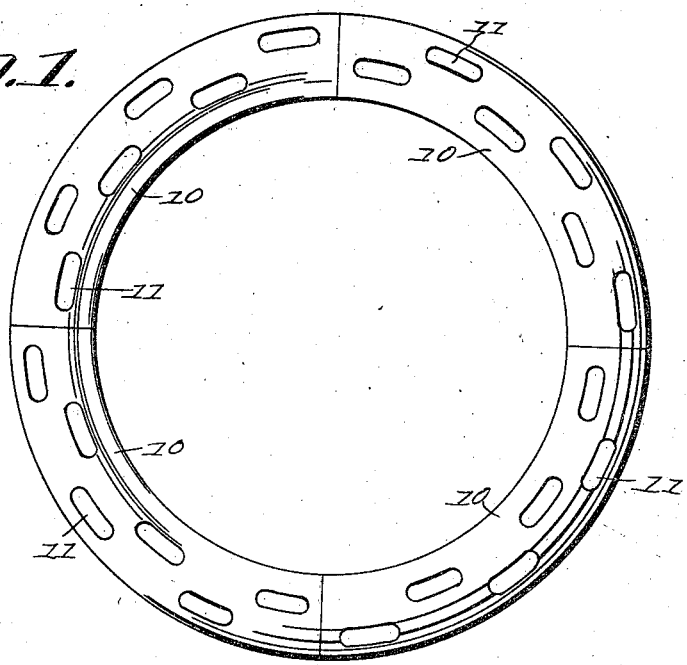
Fig. 1.
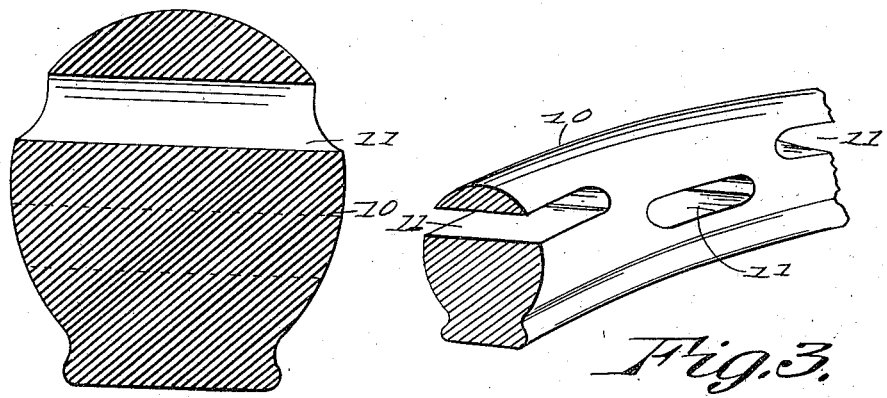
Fig. 2.
Fig. 3.
Inventors
Harry G. Westgate
and Lizzie B. Westgate,
By
Attorney Patented Feb. 13, 1923.

1,444,892

UNITED STATES PATENT OFFICE.

HARRY GROVER WESTGATE AND LIZZIE BELL WESTGATE, OF UNION, NEW YORK.

TIRE FILLER.

Application filed January 26, 1921. Serial No. 440,145.

*To all whom it may concern:*

Be it known that HARRY GROVER WESTGATE and LIZZIE BELL WESTGATE, citizens of the United States of America, residing at Union, in the county of Broome and State of New York, have invented new and useful Improvements in Tire Fillers, of which the following is a specification.

The object of the invention is to provide a filler for yielding tires as a substitute for and devoid of the disadvantages of a pneumatic tube or filler while possessing the substantial advantages of the pneumatic filler or inner tube in so far as the cushioning effect is concerned, and furthermore to provide a non-puncturable filler wherein the maximum resilience or cushioning effect is in the direction of the plane of the wheel and hence in the plane of the application of load to the tire while affording a substantial resistance to lateral strains tending to deflect the tire transversely with relation to the tread or path of travel of the tire; and with these objects in view the invention consists in a construction and combination of parts of which a preferred embodiment is shown in the accompanying drawings, wherein:

Figure 1 is a side view of a filler embodying the invention.

Figure 2 is a transverse sectional view enlarged of the same.

Figure 3 is a perspective view of a portion of the filler.

The improved filler consists essentially of a ring of rubber or rubber composition which may as shown be constructed in sections 10, of any preferred number to facilitate the introduction thereof into a tire casing or shoe of any of the well known or approved forms in lieu of the usual pneumatic or inflatable tubes now employed in this connection as a means of distending the casing or shoe. The filler is of a transverse contour or cross sectional shape corresponding with the interior of the casing or shoe and is provided with transverse openings 11 which penetrate the filler from side to side, with the extremities thereof open at the side surfaces of the same, and preferably elongated longitudinally or circumferentially of the ring as shown clearly in Figure 1. A plurality of circumferential series of these openings 11 may be provided, two of such series being shown in the drawing, and preferably the openings in the said series are arranged in staggered but not in overlapping relation. The result is that, when the filler is subjected to pressure incident to the load applied to the tire of which it forms a part, the filler is compressed in the direction of the application of the load while affording a substantial resistance to any tendency to move or yield laterally or in a direction transversely of the filler, although obviously there will be a sufficient yield transversely to cushion strains applied in that direction.

Moreover while the tendency of a load applied to a tire provided with a filler constructed as described will be to collapse the openings 11 which are in or near the line of application of the load, the arrangement of the openings is such as to distribute the strain or tendency to compression with the effect of maintaining an effective exterior contour of the tire casing or shoe.

A further advantage in the construction of the filler of sections resides in the fact that one or more thereof may be replaced in the event of mutilation without involving the expense of a complete filler.

Having described the invention, what is claimed as new and useful is:—

A filler for tire casings or shoes consisting of a ring of compressible elastic material having a plurality of circumferentially arranged series of openings penetrating the same on lines transverse to the application of the load to the tire, the said openings being elongated circumferentially of the ring with their upper and lower walls arranged in parallelism, the units of adjacent series being in staggered but not overlapping relation.

In testimony whereof they affix their signatures.

HARRY GROVER WESTGATE.
LIZZIE BELL WESTGATE.